United States Patent [19]

Wilkinson et al.

[11] Patent Number: 4,994,001
[45] Date of Patent: Feb. 19, 1991

[54] VALVE ACTUATOR DIFFERENTIAL WORM PLANETARY GEAR DRIVE

[75] Inventors: Ivan E. Wilkinson, Lynchburg; Charles L. Hylton, Madison Heights; R. Gregory Pence, Forest, all of Va.

[73] Assignee: Limitorque Corporation, Lynchburg, Va.

[21] Appl. No.: 390,551

[22] Filed: Aug. 7, 1989

Related U.S. Application Data

[63] Continuation-in-part of Ser. No. 173,195, Mar. 24, 1988, Pat. No. 4,896,562.

[51] Int. Cl.⁵ .................. F16H 1/32; F16H 37/06; F16H 55/22
[52] U.S. Cl. .......................... 475/4; 74/458; 251/129.03; 475/7
[58] Field of Search .............. 74/475, 458; 475/3, 475/4, 7; 251/129.03

[56] References Cited

U.S. PATENT DOCUMENTS

| | | | |
|---|---|---|---|
| 1,793,228 | 2/1931 | Hackethal | 475/4 |
| 2,955,486 | 10/1960 | Bacchi | 475/4 X |
| 3,422,704 | 1/1969 | Catlett | 475/4 |
| 4,261,224 | 4/1981 | Sulzer | 475/7 X |

FOREIGN PATENT DOCUMENTS

| | | | |
|---|---|---|---|
| 1550502 | 1/1970 | Fed. Rep. of Germany | |
| 360041 | 6/1938 | Italy | 475/4 |
| 610746 | 10/1948 | United Kingdom | 475/4 |

OTHER PUBLICATIONS

Gear Design, Article extracted from p. 53, Richard C. Bryant and Darle W. Dudley, prior 1970, "Self-Locking Characteristics".

Primary Examiner—Allan D. Herrmann
Attorney, Agent, or Firm—Paul & Paul

[57] ABSTRACT

A valve actuator differential worm planetary gear drive provides forward or reverse motion to a valve stem, from an input from either a motor-driven worm or a handwheel drive worm, by using a plurality of planet gears to send motion to the sun gear. If the preference is to have the motor drive the valve primarily, the manual worm stays locked and the motor worm acts as a planetary arm. When it is desired to move the valve by hand, the motor gear is fixed and rotation of the handwheel worm gear transmits the power through the ring gear and the planet gears to the drive sleeve.

7 Claims, 7 Drawing Sheets

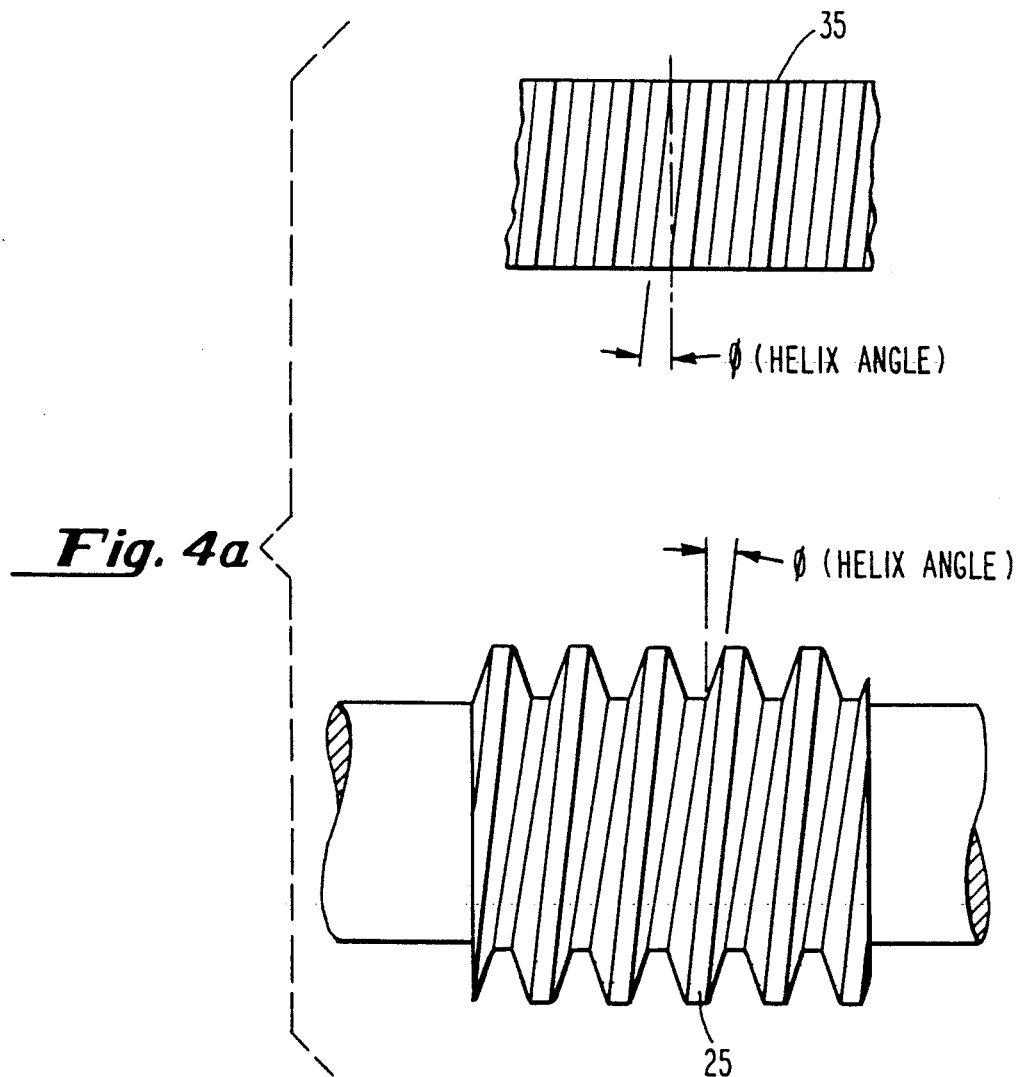

VALVE ACTUATOR DIFFERENTIAL WORM PLANETARY GEAR DRIVE

CROSS-REFERENCE TO RELATED U.S. APPLICATIONS

This application is a continuation-in-part of U.S. patent application Ser. No. 07/173,195, filed Mar. 24, 1988, now U.S. Pat. No. 4,896,562, issued Jan. 30, 1990, for VALVE ACTUATOR DIFFERENTIAL WORM PLANETARY GEAR DRIVE.

BACKGROUND OF THE INVENTION

General valve application requirements dictate that motorized valve actuators or operators must have provision for manual operation in case of power failure or in the case of initial installation and set-up when power may not be available. Safety requirements dictate that the power and manual drives operate independently so as to preclude movement of the manual input (handwheel, lever, etc.) during power operation. Traditionally, the requirement for independent manual operation has been satisfied by placing a clutching device within or attached to the actuator power train. The function of the clutching device is to nate drive (manual or power).

Engagement or disengagement of the clutching device can be accomplished by several means including: (i) depressing a lever to move a clutch element; (ii) pushing or pulling a handwheel into engagement; and (iii) rotating a handwheel which causes clutch elements to engage.

All of the above provide for totally independent drive, either manual or motor, i.e., the drive arrangement is either motor or manual, the drives are never engaged simultaneously.

Other types of clutches may be used which provide for single direction power transmission, i.e., clockwise or counterclockwise torque may be transmitted via a handwheel through the clutch to the power train but may not be transmitted from the power train through the clutch to the handwheel. Clutch arrangements of this type have the inherent disadvantage of back-driving the power element unless the power element is disengaged by alternate means.

Also known in the art is the valve actuator disclosed in U.S. Pat. No. 4,261,224 to Sulzer. There, a valve actuator is operable alternatively by a motor or manually. The motor is coupled through a special one-way coupling to the sun-gear drive of the planetary assembly which permits the motor to drive the sun gear in either direction upon rotation of the motor but prevents rotation of the sun gear when the motor is arrested. A handwheel is coupled to the ring-gear drive of the planetary assembly through a worm and pinion so that the handwheel may then drive the ring gear under manual operation, but the ring gear is retained against rotation by the worm pinion when the handwheel is idle.

SUMMARY OF THE INVENTION

A valve actuator mechanism that may be operated by either a motor-provided input force or a hand-operated input force is disclosed. The motor-provided force is transmitted through a worm and gear combination to the sun gear, which, in turn transmits the force to planet gears adjacent thereto. The planet gears transmit the force through planet carrier arms to the drive sleeve and that component moves the valve stem in the correspondingly proper direction. If control of the stem is to be provided by the handwheel, the worm and gear combination attached thereto transmits the input force to the ring gear, which transmits it through the planet gears, to the drive sleeve and stem, as described above. Either the motor worm and gear or the handwheel worm and gear will self-lock by setting the geometry of the handwheel and automatic worm gear sets so that the tangent of the helix angle of the gear is less than the coefficient of friction, thereby preventing back-driving, when the alternate has power applied thereto.

In an alternate embodiment, planet gears are attached to a motor-driven worm gear, and the ring gear is attached to and rotates with, the handwheel driven worm gear. Motor input causes the worm gear to drive the sun gear whereas with handwheel operation, the planet gears are idler gears and force from the handwheel worm gear is transmitted through the ring gear, the idle planet gears and to the sun gear. In both cases, the sun gear drives the actuator sleeve and hence, the stem, which moves the valve.

It is therefore an object of the present invention to provide a valve actuator mechanism that allows either motor-driven or hand-operated input while, through design of helix angle of both the worm teeth and gear teeth, operation of one causes automatic self-locking of the other.

It is a further object of the present invention to provide a valve actuation mechanism which does not use a clutching device to disengage the unused input device during operation.

It is a still further object of the present invention to provide a valve actuation mechanism that provides forward or reverse motion to a valve stem, from an input from either a motor-driven worm or a hand-operated worm, by using planet gears to send motion to the sun gear. These and other objects and advantages of the present invention will be readily apparent to those skilled in the art by reading the following Description of the Preferred Embodiment and the appended claims.

BRIEF DESCRIPTION OF THE DRAWINGS

FIG. 4a is an exploded, schematic illustration of the geometric relationship between the helix angles of the worm teeth and the gear teeth of FIG. 4;

DETAILED DESCRIPTION OF THE PREFERRED EMBODIMENT

Figure 1:
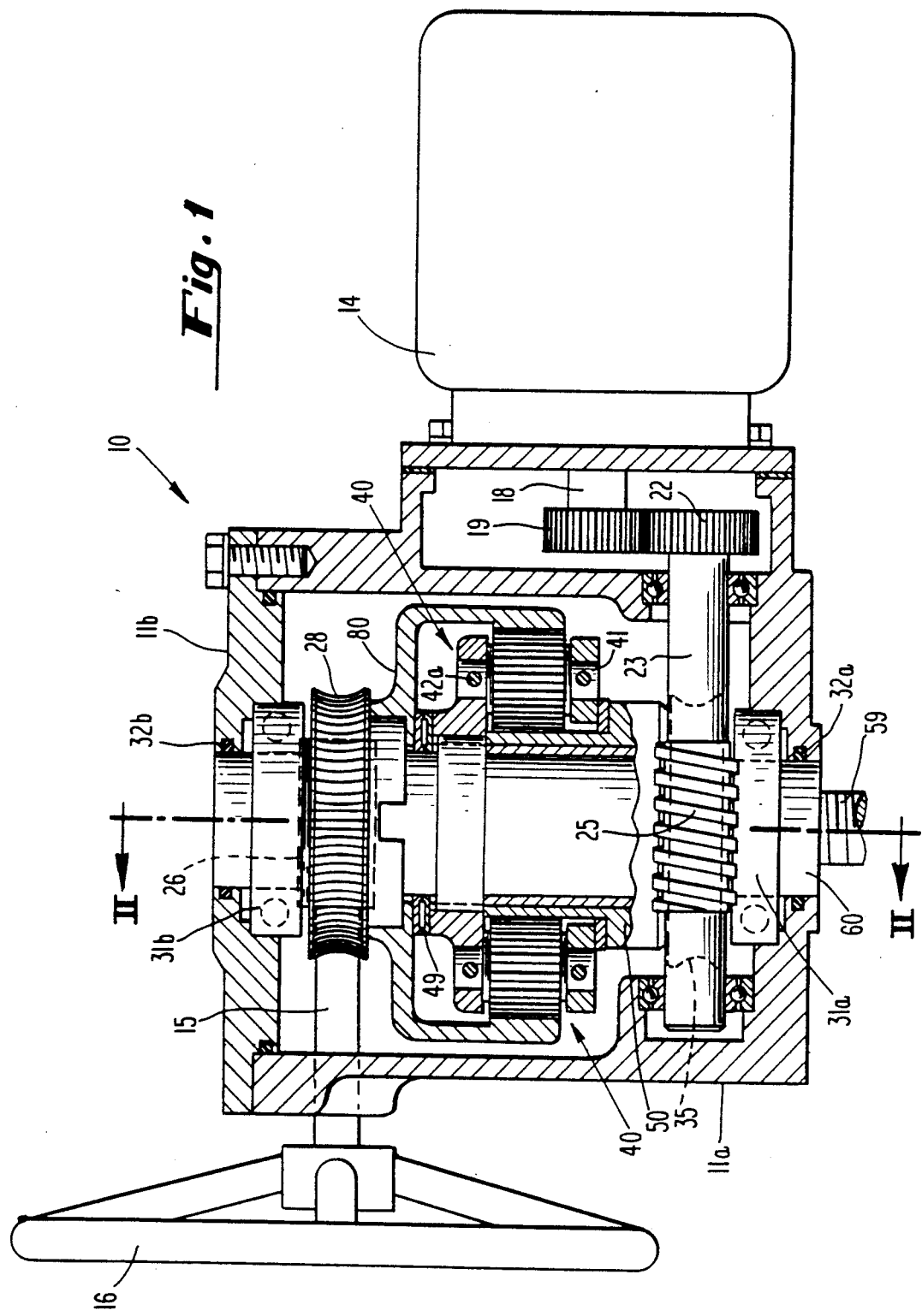
FIG. 1 is an elevational view of a valve actuator mechanism 10 with casing 11 cut away and the valve stem and drive sleeve partially cut away to show the motor worm.

FIG. 1 shows an elevational view of the actuator mechanism 10. Mechanism 10 is housed in a casing 11, as for example bottom casing 11a with top casing 11b bolted thereto as is known in the art, and FIG. 1 shows casing 11 cut away for sake of clarity. Mechanism 10 can be made from stainless steel, or other similar material, and controls the movement (as will be described of a stem 59 in a drive sleeve 60, said stem 59 being operatively connected to a valve (not shown).

As seen in FIG. 1, valve actuator 10 has both a motor driven input 18 from motor 14 and a hand-operated input 15 from a handwheel 16. (Note: the stem 59 and drive sleeve 60 have been partially obscured in FIG. 1 to show the motor worm 25.) Motor shaft 18 is connected to a gear 19, which gear 19 intermeshes with, and turns, a gear 22, as is known. Gear 22 is connected to a shaft 23 containing motor worm 25.

The input 15 from handwheel 16 can be seen at the top end of actuator 10 in FIG. 1. Shaft 15 is coupled to a worm 26 (shown in phantom in FIG. 1) which, in turn, is coupled to handwheel worm gear 28. Drive sleeve 60 is secured in actuator 10 is by clamping mechanisms 31a, b, as is known, with shims 32a, b to provide proper fitting thereto. With power from either motor input 18 or handwheel input 15, planet gears 40 and ring gear 80 allow transfer thereof (as will be explained) to drive stem 59, to enable drive stem 59 to move a valve (not shown) to an open or closed position. As is known in the industry, both motor worm gear and handwheel worm gear contain self-locking characteristics that prevent any motion thereof when that drive input is not being utilized.

Figure 2:
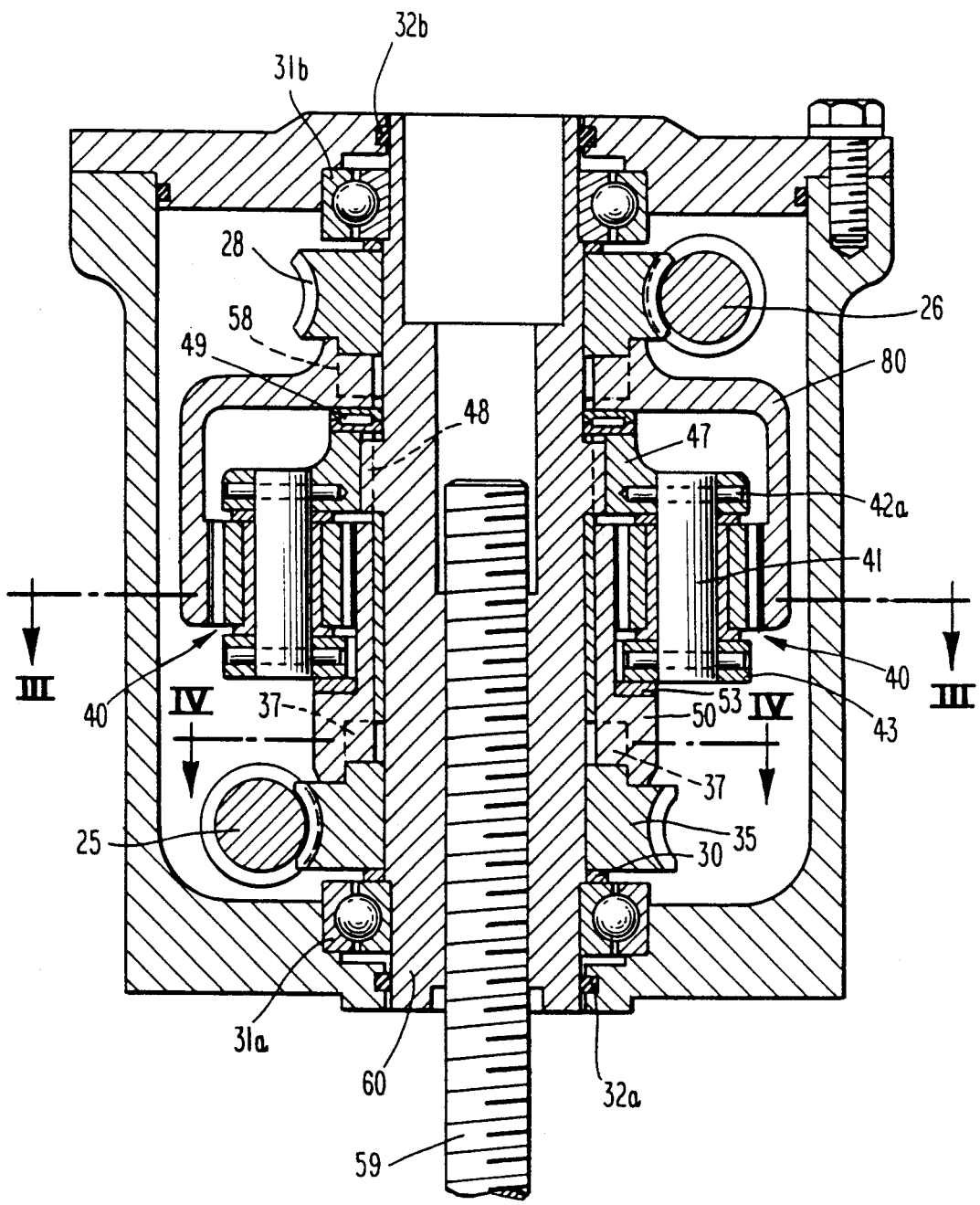
FIG. 2 is a sectional view of valve actuator 10 taken along lines II—II of FIG. 1.
Figure 4:
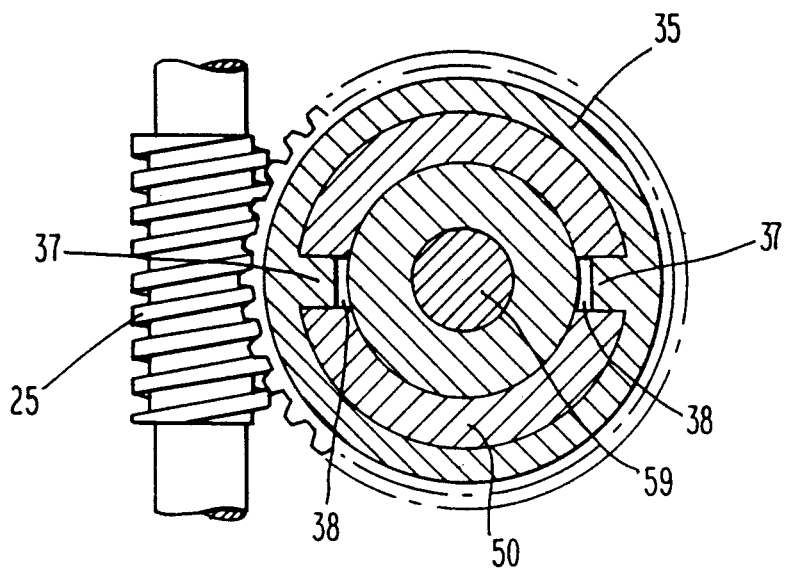
FIG. 4 is a sectional view of valve actuator 10 taken along lines IV—IV of FIG. 2.

FIG. 2 shows a sectional view of valve actuator 10 taken along lines II—II of FIG. 1, and shows the working relationship between motor worm 25 and motor worm gear 35 (shown in phantom in FIG. 1) and the working relationship between handwheel worm 26 (shown in phantom in FIG. 1) and handwheel worm gear 28. The power-transferring relationship between worm 25 and gear 35 can be seen also in FIG. 4, which is a sectional view taken along lines IV—IV of FIG. 2. Gear 35 is free to rotate around drive sleeve 60 at the interior thereof, and rests and moves against spacer 30 as is shown. As seen in FIG. 4, gear 35 carries a plurality of keys 37 (shown in phantom in FIG. 2) that lock into keyways 38 in sun gear 50, thereby forcing rotational movement of gear 50 whenever input motion is transmitted by worm 25 to gear 35. With reference to FIG. 4a, an exploded, schematic illustration of the geometric relationship between the helix angles of the worm teeth and the worm gear of FIG. 4, the self-locking characteristics of the instant invention will be explained. The helix angle 0 of the worm and the worm gear is designed to be no greater than 5 degrees for an environment of, for instance, a smooth steel worm operating on a bronze worm gear in well-lubricated gear set. The helix angle is designed as such with the tangent of 0 less than the coefficient of friction, so that the gear set, either motor worm 25 and gear 35 or handwheel worm 26 and gear 28, does not back drive (i.e. worm drives gear but gear cannot drive worm).

Figure 3:
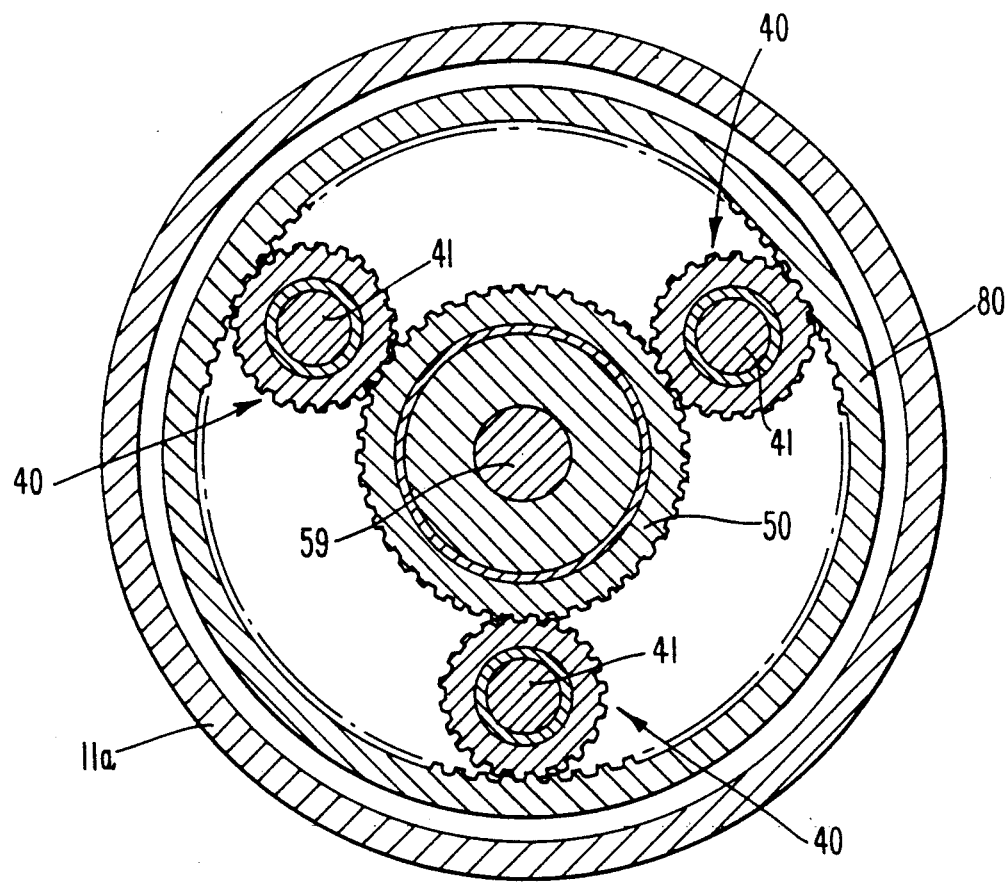
FIG. 3 is a sectional view of valve actuator 10 taken along lines III—III of FIG. 2.

Immediately adjacent a ledge 52 of sun gear 50, is a support washer 53 to provide moving support to planet gears 40. As shown in FIG. 3, a sectional view taken along lines III—III of FIG. 2, planet gears 40 are operatively coupled between the teeth of ring gear 80 and the teeth of sun gear 50. Each planet gear 40 is identical to the others and so the description herein provided pertains to all. Gear 40 is in the general form of a right cylinder with teeth distributed around the outside thereof as is known. A shaft 41 runs throughout the center of gear 40 and is affixed, as by pin 42a to one of a plurality of carrier arms 47. A second pin, or the like, 42b is used to secure bottom section 43 thereto, which section 43 slides over support washer 53, as described above. Carrier arms 47 are fixed to drive sleeve 60, as by keys 48 (shown in phantom in FIG. 2) and have needle bearing 49 adjacent the top thereof.

Ring gear 80 surrounds the planet gears 40 (see FIG. 3) and is coaxial with stem 59. Ring gear 80 rests on needle bearing 49, and is affixed to handwheel worm gear 28, as by keys 58 (shown in phantom in FIG. 2) as is known.

Figure 5A:
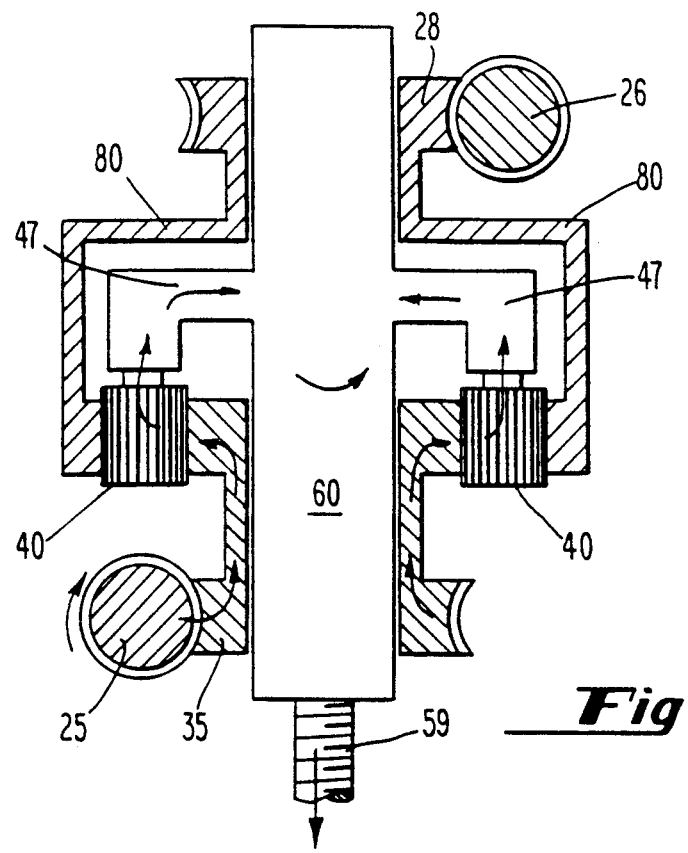
FIGS. 5a and 5b are schematic representations of valve actuator 10 with arrows showing how control and power are transferred from the motor (FIG. 5a) or the handwheel (FIG. 5B).
Figure 5B:
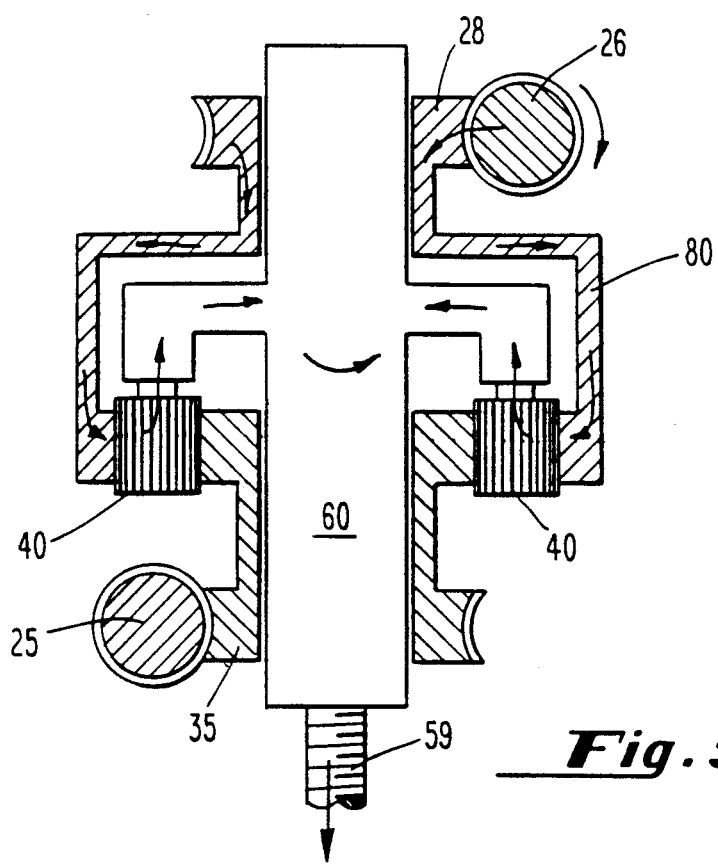

FIGS. 5a and 5b show a schematic representation of valve actuator 10 with arrows showing how control and power is transferred from either the motor-driven worm to the stem (FIG. 5a) or the handwheel worm to the stem (FIG. 5b). FIG. 5a shows that the motor provided force is transmitted through a worm 25 to worm gear 35. The motion is transferred from there through sun gear 50 to planet gears 40. Since the handwheel worm gear prevents motion of ring gear 80, the moving planet gears 40 force carrier arms 47, and drive sleeve 60, to transfer movement to drive stem 59. FIG. 5b shows that when motion is transferred through worm 26 and gear 28 to ring gear 80, the reaction of gear 80 on planet gears 40 transfers the force through carrier arms 47 to drive sleeve 60 and stem 59. If a different reduction preference (of the gears) is desired, the handwheel worm connection and the motor worm connection may be reversed.

Figure 6:
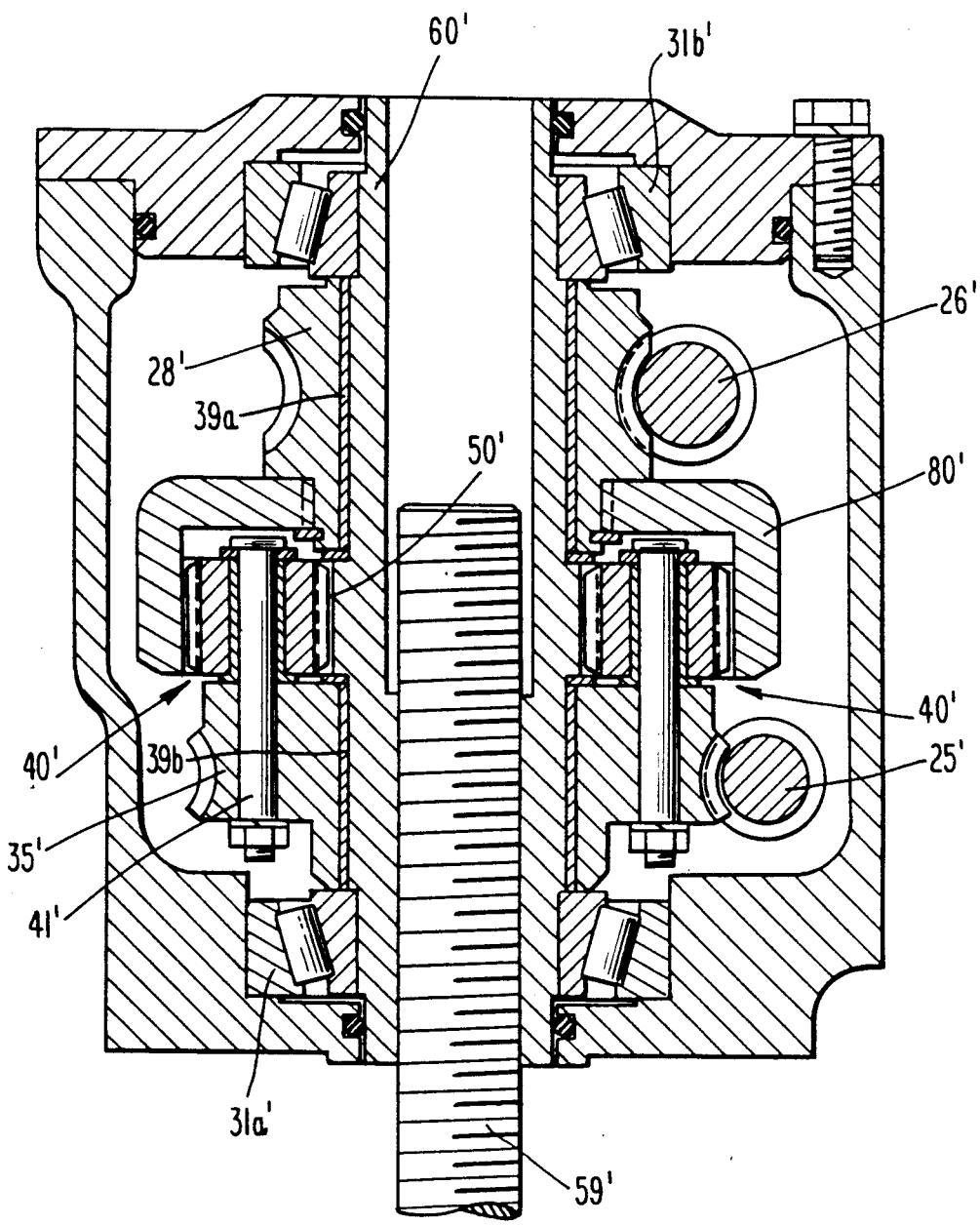
FIG. 6 shows a sectional view, similar to FIG. 2, of an alternate embodiment of valve actuator 10' with the sun gear 50' connected directly to the actuator sleeve 60' and the planet gears 40' connected to the motor worm gear 35'.
Figure 7A:
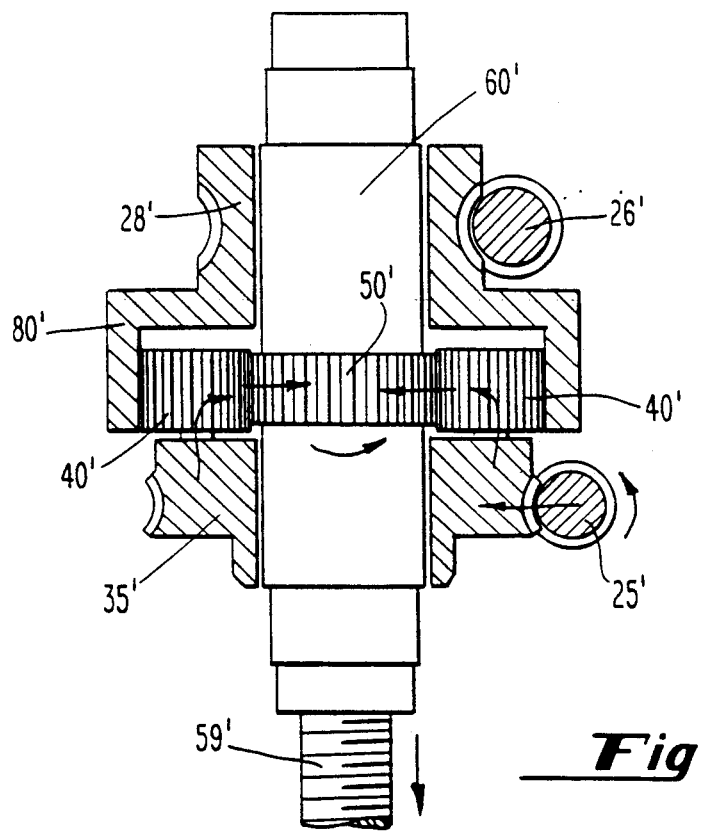
FIGS. 7a and 7b are schematic representations of valve actuator 10' with arrows showing how control and power are transferred from the motor (FIG. 7a) or the handwheel (FIG. 7b).
Figure 7B:
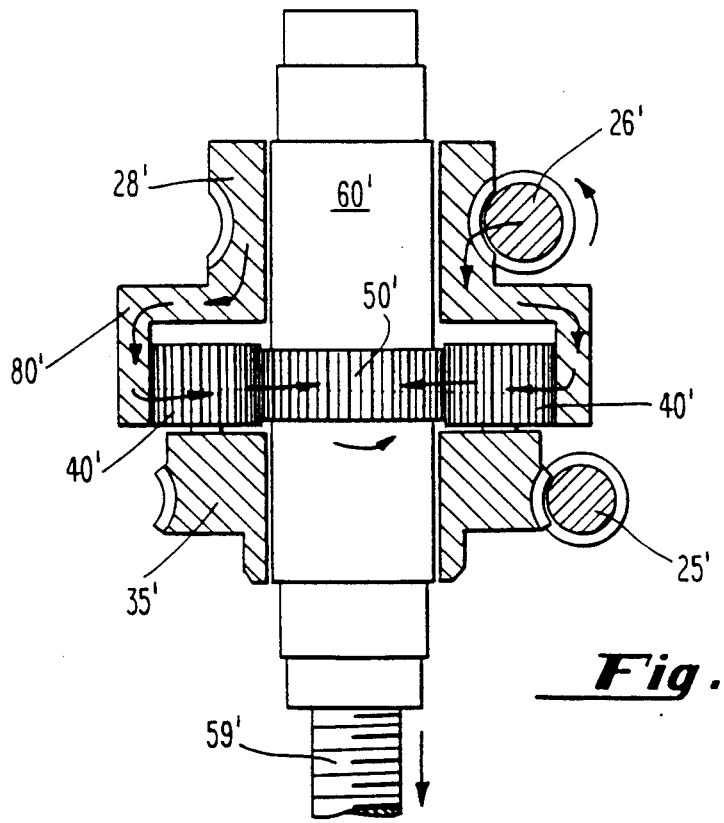

FIG. 6 shows a sectional view (similar to FIG. 2) taken along the vertical axis of an alternate embodiment of the valve actuator. (In FIG. 6, the worm 25' coupled to the motor is shown on the opposite side of mechanism 10' than shown in FIG. 2.) Mechanism 10' has stem 59' coaxial with sleeve 60', which sleeve 60' is connected to sun gear 50', as shown. Bushings 39a, b, respectively, further enclose drive sleeve 60' to allow free rotation therearound by handwheel worm gear 28' and motor worm gear 35'. Surrounding bushing 39b is worm gear 35' which is on top of bushing 31a, is circular in shape, and has a plurality of gear pins 41' spaced evenly apart and bolted therethrough. Rotating freely on each of pin 41' is a planet gear 40'. Fixed to the central part of drive sleeve 60', between outer bushings 39a,b is a sun gear 50'. Sun gear 50' has teeth to mesh with the teeth of planet gears 40' in a driving relation as in known. Coaxially surrounding, and operatively coupled with, planet gears 40' is a ring gear 80' having internal teeth as is known.

As shown in the schematic diagrams of 7a and 7b, mechanism 10' will operate with the handwheel and motor connected in the above-described positions. These two components would be reversed if conditions required giving reduction preference to the motor or the handwheel. If the preference is to have the motor drive the valve primarily, the motor gear 35' acts as a planetary arm and the manual worm gear 28' is locked by means known in the industry and as explained above. The locking fixes ring gear 80' and rotation of the motor worm gear 35' causes the planet gears 40' to drive sun gear 50', and hence drive sleeve 60' and stem 59'. When it is desired to move the valve by hand, the motor worm gear is fixed and rotation of the handwheel worm gear 28' transmits torque through the idled planet gears 40' to the sun gear 50', and hence to drive sleeve 60' and stem 59'.

What we claim is:

1. A valve actuator for controlling valve movement, comprising:
   (a) a bi-directional motor-operated drive means;
   (b) a bi-directional manually-operated drive means;
   (c) a first worm fixedly attached to said motor-operated drive means;
   (d) a second worm fixedly attached to said manually-operated drive means.
   (e) a first worm gear operatively engaged with said first worm;
   (f) a second worm gear operatively engaged with said second worm;
   (g) planetary drive means operably connected to said first and second worm gears and to a rotatable sleeve member, said planetary drive means comprising:
      (1) a sun gear concentrically disposed about said sleeve member;
      (2) a plurality of planet gears operatively engaged with said sun gear;
      (3) a ring gear concentrically disposed about said sun gear and operably engaged to said plurality of planet gears;
   (h) an elongate stem disposed within said sleeve member for non-rotational axially reciprocal movement relative thereto in response to rotation of said sleeve member;
   (i) wherein upon actuation of said motor-operated drive means, said second worm and said second worm gear remain stationary, and wherein upon actuation of said manually-operated drive means, said first worm and said first worm gear remain stationary;
   (j) wherein said sun, ring and planet gears are coplanar relative to one another and in adjacent parallel planes relative to said first worm and gear and to said second worm and gear;
   (k) wherein said first worm and gear have a helix angle is less than the coefficient of friction between said first worm and said first worm gear;
   (l) wherein said second worm and gear have a helix angle such that the tangent of said helix angle is such that the tangent of said helix angle is less than the coefficient of friction between said second worm and said second worm gear; and
   (m) wherein said first and second worm gears are each disposed concentrically around said sleeve member.

2. The valve actuator of claim 1 wherein said sun gear is fixedly attached to said first worm gear, and wherein said planetary drive means further comprises a plurality of carrier arms, each of said carrier arms being affixed to said rotatable sleeve member and to one of said planetary gears.

3. The valve actuator of claim 2, wherein said sun gear is fixedly attached to said first worm gear by a plurality of keys.

4. The valve actuator of claim 2, wherein said sun gear further comprises means for supporting said plurality of planet gears.

5. The valve actuator of claim 2, wherein said ring gear is fixedly attached to said second worm gear.

6. The valve actuator of claim 1, wherein said plurality of planet gears are fixedly attached to said first worm gear, and wherein said sun gear is fixedly attached to said sleeve member.

7. The valve actuator of claim 6, wherein said ring gear is fixedly attached to said second worm gear.

* * * * *